(12) United States Patent
Pistilli et al.

(10) Patent No.: US 11,318,872 B2
(45) Date of Patent: May 3, 2022

(54) VEHICLE SEAT ASSEMBLY WITH IMPACT ENERGY MANAGEMENT

(71) Applicant: Lear Corporation, Southfield, MI (US)

(72) Inventors: Gregory Pistilli, Freising (DE); Florian Gerbl, Berglern (DE); Mathias Busch, Freising (DE); Alexej Niederhaus, Welden (DE); Michael Schuhbauer, Schweitenkirchen (DE); Arunkumar Boda, Ingolstadt (DE); Tino Schneider, Isen (DE); Rajdeep Rajput, Freising (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/087,297

(22) Filed: Nov. 2, 2020

(65) Prior Publication Data
US 2021/0188143 A1 Jun. 24, 2021

(30) Foreign Application Priority Data
Dec. 19, 2019 (DE) .......................... 102019220261.6

(51) Int. Cl.
| | | |
|---|---|---|
| *B60N 2/888* | (2018.01) | |
| *B60N 2/897* | (2018.01) | |
| *B60N 2/68* | (2006.01) | |

(52) U.S. Cl.
CPC ............ *B60N 2/888* (2018.02); *B60N 2/682* (2013.01); *B60N 2/897* (2018.02)

(58) Field of Classification Search
CPC ................................. B60N 2/888; B60N 2/897
See application file for complete search history.

(56) References Cited

U.S. PATENT DOCUMENTS

| 9,592,755 B2 | 3/2017 | Takayama et al. | |
|---|---|---|---|
| 2002/0050729 A1* | 5/2002 | Nakano ................. | B60N 2/838 297/216.12 |
| 2019/0092198 A1* | 3/2019 | Inoue ..................... | B60N 2/897 |

FOREIGN PATENT DOCUMENTS

| CN | 207842738 U | 9/2018 | |
|---|---|---|---|
| CN | 111907386 A * | 11/2020 | ............... B60N 2/68 |

(Continued)

OTHER PUBLICATIONS

U.S. Patent Application entitled "Vehicle Seat Assembly With Impact Energy Management", U.S. Appl. No. 17/086,721, filed Nov. 2, 2020, 16 pages.

(Continued)

*Primary Examiner* — Timothy J Brindley
(74) *Attorney, Agent, or Firm* — Brooks Kushman P.C.

(57) ABSTRACT

A vehicle seat assembly is provided with a seat back frame. A bracket is provided with a substrate welded to the seat back frame. Two pairs of sidewalls extend from the substrate and are tapered with an enlarged region at an upper distal end. A pair of support plates are each supported by one of the two pairs of sidewalls and spaced apart from the substrate to provide a mounting surface. A pair of spaced apart tubes are each welded to the bracket mounting surface of one of the pair of support plates. A pair of head restraint posts are each received in one of the pair of tubes. A head restraint is supported upon the pair of head restraint posts, so that upon a rear vehicle impact, the bracket deforms as the pair of head restraint posts are translated toward the seat back frame.

14 Claims, 2 Drawing Sheets

(56) References Cited

FOREIGN PATENT DOCUMENTS

| FR | 2968613 A1 | 6/2012 | |
|---|---|---|---|
| FR | 3097176 A1 * | 12/2020 | ............... B60N 2/43 |
| JP | 201018140 A | 1/2010 | |
| KR | 102187558 B1 * | 12/2020 | |
| WO | WO-0035707 A1 * | 6/2000 | ............. B60N 2/888 |

OTHER PUBLICATIONS

U.S. Office Action for U.S. Appl. No. 17/086,721, dated Aug. 11, 2021, 9 pages.

* cited by examiner

VEHICLE SEAT ASSEMBLY WITH IMPACT ENERGY MANAGEMENT

CROSS-REFERENCE TO RELATED APPLICATION

This application claims foreign priority benefits under 35 U.S.C. § 119(a)-(d) to DE 10 2019 220 261.6, Filed Dec. 19, 2019, the disclosure of which is hereby incorporated by reference in its entirety.

TECHNICAL FIELD

Various embodiments relate to vehicle seat assemblies including a head restraint extending from a seat back to support the back and head of an occupant during travel and during a rear impact condition.

BACKGROUND

Vehicle seat assemblies often include a head restraint extending from a seat back to support the back and head of an occupant during travel and during a rear impact condition.

SUMMARY

According to at least one embodiment, a vehicle seat assembly is provided with a seat back frame adapted to be mounted to a vehicle interior. A bracket is mounted to the seat back frame. At least one head restraint post is mounted to the bracket and spaced apart from the seat back frame so that upon a rear vehicle impact, the bracket deforms as the at least one head restraint post is translated toward the seat back frame.

According to a further embodiment, the bracket is further provided with a substrate. A projection extends from the substrate. A mounting surface is provided on the projection to mount the at least one head restraint post.

According to an even further embodiment, the projection is tapered with an enlarged region at an upper distal end relative to a lower proximal end.

According to another even further embodiment, the projection is further provided with a pair of sidewalls extending from the substrate.

According to an even further embodiment, the projection is further provided with a support plate supported by the pair of sidewalls and spaced apart from the substrate to provide the mounting surface.

According to an even further embodiment, the support plate is not parallel with the substrate.

According to an even further embodiment, the support plate is oriented at an angle relative to the substrate.

According to an even further embodiment, the angle faces an upright direction.

According to another further embodiment, the bracket is formed from a sheet of material.

According to an even further embodiment, the bracket is formed from sheet steel.

According to another further embodiment, at least one tube is mounted to the bracket and sized to receive the at least one head restraint post.

According to an even further embodiment, the bracket is welded to the seat back frame.

According to an even further embodiment, the at least one tube is welded to the bracket.

According to another further embodiment, a head restraint supported upon the head restraint post.

According to another embodiment, a vehicle seat assembly is provided with a seat back frame adapted to be mounted to a vehicle interior. A bracket is mounted to the seat back frame. At least one head restraint tube is mounted to the bracket and spaced apart from the seat back frame so that upon a rear vehicle impact, the bracket deforms as the at least one head restraint tube is translated toward the seat back frame.

According to an even further embodiment, at least one head restraint post is received within the at least one head restraint tube.

According to an even further embodiment, a head restraint is supported upon the head restraint post.

According to another even further embodiment, the bracket is further provided with a substrate. A projection extends from the substrate. A mounting surface is provided on the projection to mount the at least one head restraint post.

According to an even further embodiment, the projection is tapered with an enlarged region at an upper distal end relative to a lower proximal end.

According to another embodiment, a vehicle seat assembly is provided with a seat back frame adapted to be mounted to a vehicle interior. A bracket is formed from a sheet of steel, and is provided with a substrate welded to the seat back frame. Two pairs of sidewalls extend from the substrate and are tapered with an enlarged region at an upper distal end relative to a lower proximal end. A pair of support plates are each supported by one of the two pairs of sidewalls and spaced apart from the substrate to provide a mounting surface oriented at an angle relative to the substrate facing an upright direction. A pair of spaced apart tubes are each welded to the bracket mounting surface of one of the pair of support plates. A pair of head restraint posts, are each received in one of the pair of tubes. A head restraint is supported upon the pair of head restraint posts, so that upon a rear vehicle impact, the bracket deforms as the pair of head restraint posts are translated toward the seat back frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
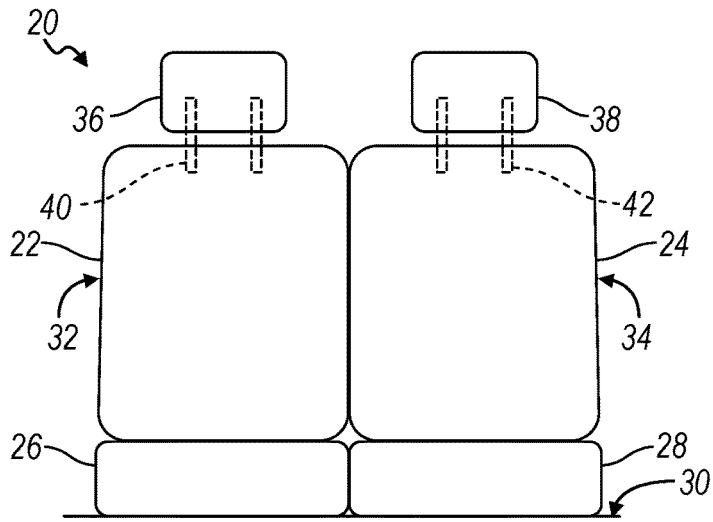
FIG. 1 is a front elevation view of a vehicle seat assembly according to an embodiment.

FIG. 1 illustrates a vehicle seat assembly 20 according to an embodiment. The vehicle seat assembly 20 may be a seat assembly in a land vehicle, such as an automobile. The vehicle seat assembly 20 may also be a seat assembly in an aircraft, watercraft, or the like. The vehicle seat assembly 20 may be a multiple passenger seat assembly with multiple seat subassemblies 22, 24. The seat assembly 20 may be located at any seating position within a vehicle. However, for the depicted seat assembly 20, the seat assembly 20 is a rear seating assembly 20. Additionally, the seat assembly 20 may include any number of seat subassemblies 22, 24, of any size, such as a sixty percent seat subassembly and a forty percent seat subassembly. However, the depicted embodiment includes two fifty percent seat subassemblies 22, 24.

The vehicle seat assembly 20 is illustrated in an upright seating position. Of course, the seat may be adjustable to non-seating, loading or cargo positions. However, terms of spatial relation, such as above, below, upper, lower are terms to describe orientations of components relative to other components, in an upright design or seating position of the seat assembly 20. Likewise, terms such as forward and rearward refer to a forward seating position of an occupant in the upright seat assembly 20.

Each seat subassembly 22, 24 includes a seat bottom 26, 28 mounted to a vehicle interior, such as a vehicle floor 30 of a vehicle body. Each seat subassembly 22, 24 also includes a seat back 32, 34, which are also mounted to the vehicle body. The seat backs 32, 34 may be mounted directly to the vehicle body, or may be pivotally connected to the seat bottoms 26, 28 to support the seat backs 32, 34 at an upright arrangement relative to the seat bottoms 26, 28.

Each seat subassembly 22, 24 also includes a head restraint 36, 38 supported above the corresponding seat back 32, 34. The head restraints 36, 38 are each connected to the respective seat back 32, 34 by a pair of head restraint posts 40, 42. The head restraint posts 40, 42 are connected to corresponding head restraints 36, 38 and seat backs 32, 34 to support and orient the head restraints 36, 38 relative to the seat backs 32, 34. As is known in the art, the head restraints 36, 38 may be adjustable relative to the head restraint posts 40, 42. As is also known in the art, the posts 40, 42 may be adjustable relative to the seat backs 32, 34.

Figure 2:
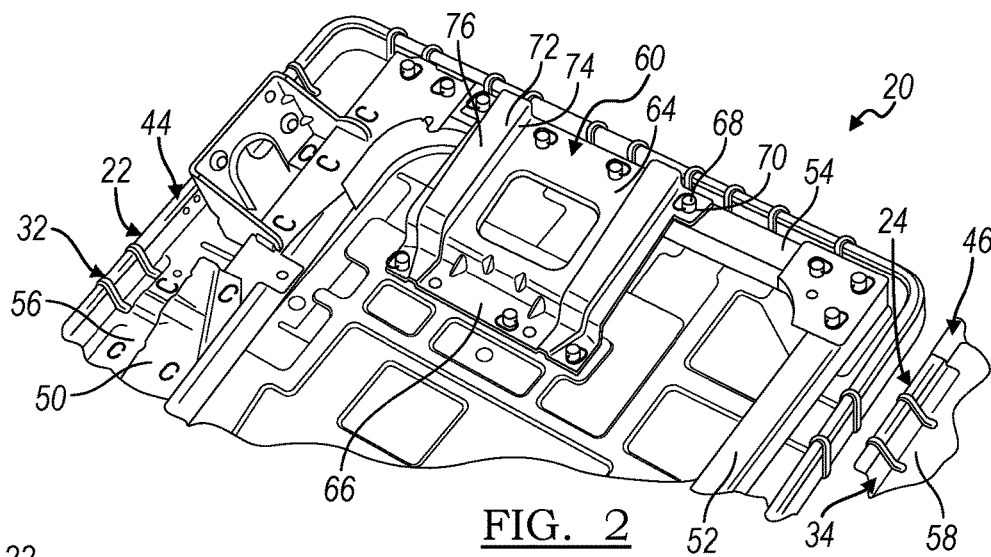
FIG. 2 is an enlarged front perspective view of a seat back of the vehicle seat assembly of FIG. 1 according to an embodiment, illustrated partially disassembled.
Figure 3:
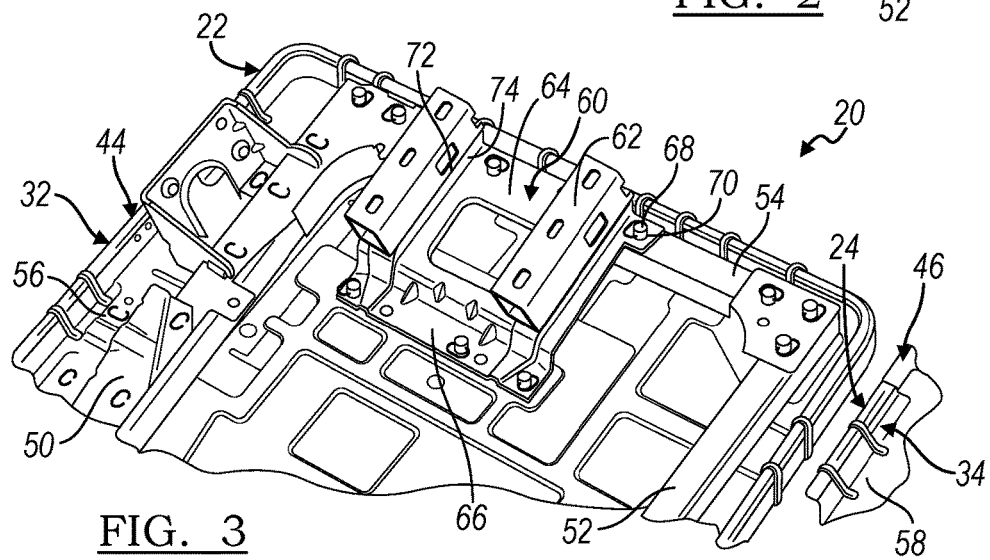
FIG. 3 is another enlarged front perspective view of the seat back of the vehicle seat assembly of FIG. 1 according to an embodiment, illustrated partially disassembled.
Figure 4:
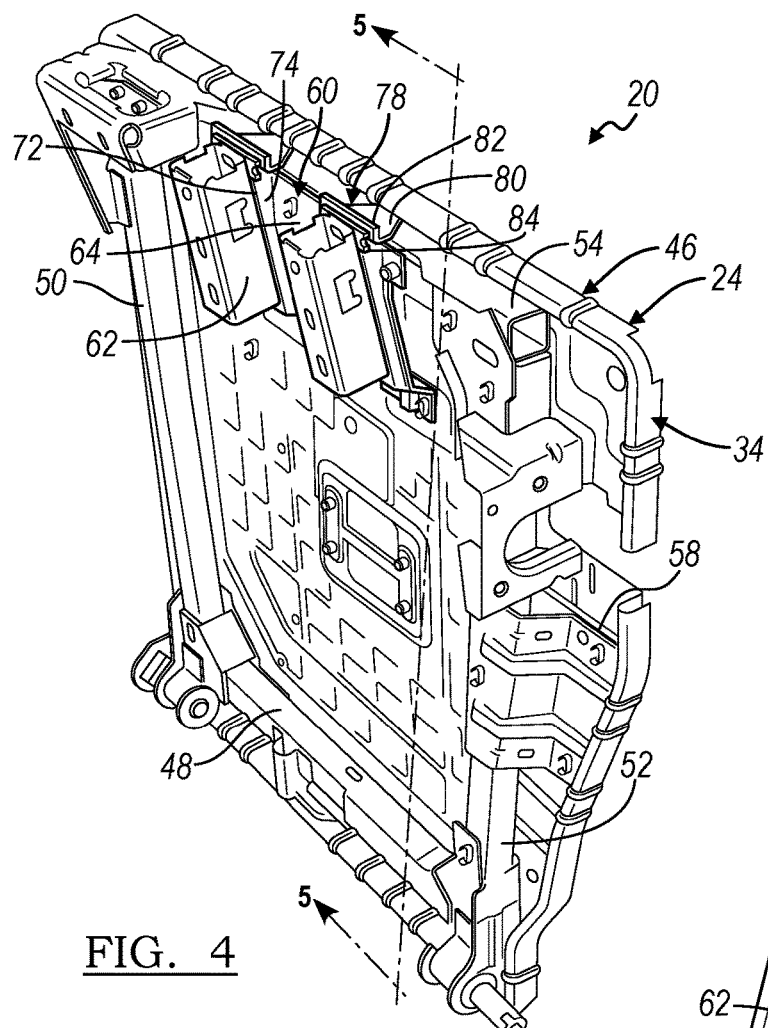
FIG. 4 is a front perspective view of another seat back of the vehicle seat assembly of FIG. 1 according an embodiment, illustrated partially disassembled.
Figure 5:
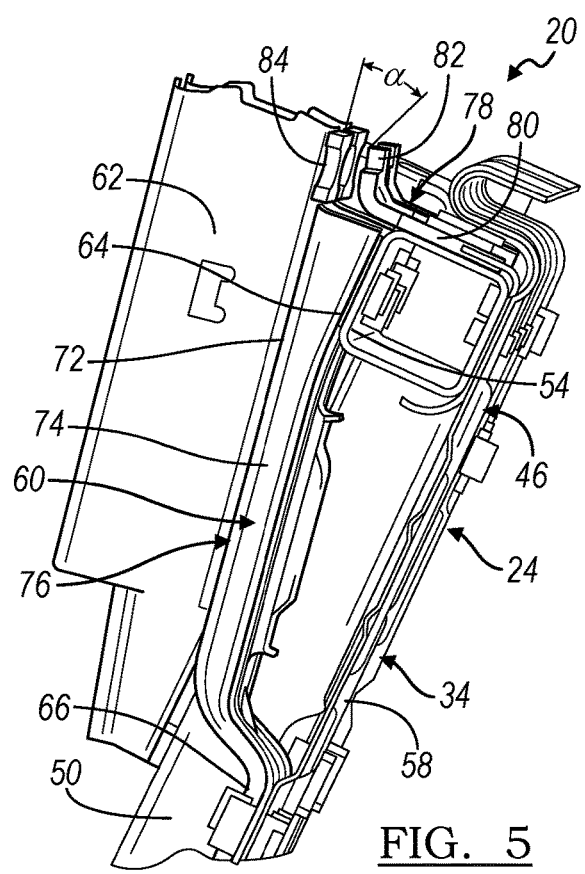
FIG. 5 is an enlarged partial section view taken along section line 5-5 in FIG. 4.

The seat bottoms 26, 28, seat backs 32, 34, and the head restraints 36, 38 each include an underlying frame, cushioning and trim, as is known in the art. FIGS. 2 and 3 illustrate a seat back frame 44, 46 for the seat backs 32, 34 with trim and cushioning removed. FIGS. 4 and 5 also illustrate the seat back frame 46 of the seat back 34. Each seat back frame 44, 46 includes a lower crossbar 48 (FIG. 4), a pair of side members 50, 52 (FIGS. 2-5) interconnecting at terminal ends of the lower crossbar 48, and extending upright to interconnect with an upper crossbar 54 (FIGS. 2-5). Each seat back frame 44, 46 also includes a substrate or platform 56 (FIGS. 2 and 3), 58 (FIGS. 2-5) spanning across the crossbars 48, 54 and side members 50, 52 to enclose the seat back 32, 34 and to separate the vehicle interior from a trunk or a cargo compartment. The components of the seat back frames 44, 46 may be formed from a structurally resilient material, such as a steel alloy, a polymeric material or the like.

It is common in the prior art to install a head restraint directly to the seat back frame by welding. In a rear impact condition, the seat assembly is accelerated into the occupant, and consequently the seat back is accelerated into the back of the occupant, while the head restraint is accelerated into the head of the occupant. In order to manage energy of the impact condition upon the head of an occupant, a less stiff connection of the head restraints 36, 38 to seat back frames 44, 46 is provided by the vehicle seat assembly 20.

With reference now to FIGS. 2-5, each vehicle seat subassembly 22, 24 includes a deformable head restraint bracket 60. The brackets 60 are each mounted to the seat back frame 44, 46. The brackets 60 support a pair of head restraint tubes 62 (FIGS. 3-5). The pair of head restraint tubes 62 receive the head restraint posts 40, 42 to support the head restraints 36, 38 upon the seat back 32, 34. An adjustment mechanism may be provided in the tubes 62 to receive the posts 40, 42 for adjustment of the posts 40, 42, and consequently adjustment of the head restraints 36, 38 relative to the seat backs 32, 34.

The bracket 60 is designed to deform to manage energy in a rear impact condition in order to increase deformation, and consequently deceleration to dissipate some of the impact forces of a rear impact. The bracket 60 is formed from stamped sheet steel with a substrate 64. The substrate 64 is displaced along the upper crossbar 54 of each seat back frame 44, 46. With reference to FIGS. 2, 3 and 5, the bracket 60 also includes an offset region 66 at a lower proximal end of the bracket 60. The offset region 66 is offset from the bracket substrate 64 to engage the seat frame platform 56, 58 of each seat back frame 44, 46. The offset region 66 is generally parallel to the bracket substrate 64 and offset by a thickness of the upper crossbar 54.

Each seat back frame 44, 46 may include a plurality of alignment pins 68 extending from the upper crossbar 54 and the seat back frame platform 56, 58. Likewise, the bracket 60 includes a plurality of apertures 70 in the bracket substrate 64 and the offset region 66 to receive the alignment pins 68. The alignment pins 68 align the brackets 60 relative to the seat back frames 44, 46. The brackets 60 are fastened to the seat back frames 44, 46 by a suitable fastener, such as by welding.

Referring again to FIGS. 2-5, each bracket 60 includes a pair of projections 72 extending forward from the bracket substrate 64. Each projection 72 includes a pair of sidewalls 74 extending from the substrate 64, interconnected with a support plate 76 (FIGS. 2 and 5), which is spaced apart from the substrate 64. Each support plate 76 provides a forward mounting surface for mounting one of the head restraint tubes 62. According to an embodiment, the head restraint tubes 62 are also formed form steel and are welded to the support plates 76 of the bracket 60.

Referring now to FIG. 5, the projections 72 may be formed so that the support plates 76 are provided at an upward facing acute angle relative to the bracket substrates 64 by a taper in the sidewalls 74 which is enlarged toward an upper distal end of the projections 72. Upon a rear vehicle impact, the seat back 32, 34 of each vehicle seat subassembly 22, 24 is accelerated into the back of the corresponding occupant. Likewise, the head restraint 36, 38 is also accelerated into a head of the corresponding occupant.

Upon a resultant force upon the head of the occupant reaching a predetermined design limit, the projections 72 of the bracket 60 deform elastically and then plastically to absorb and dissipate the impact forces to manage energy from the impact. During this deformation, the sidewalls 74 of the projections 72 compress, and then collapse to decelerate the head of the seated occupant, while the support plate 76 translates toward the seat back frame 44, 46 and the angle between the support plate 76 and the bracket substrate 64 converges. A deformation limit of the bracket 60 can be provided whereby the head restraint tubes 62 collapse into indirect contact with the upper crossbar 54. The predetermined force for collapsing the bracket 60 can be optimized by selection of bracket materials, thickness of the sheet metal, size of the projection sidewalls 74, and other variables in the design of the bracket 60.

Referring now to FIGS. 4 and 5, the head restraint tubes 62 are welded to the bracket 60 at an orientation to extend above the upper crossbar 54. The vehicle seat subassembly 24 includes an additional translation limit to prevent a full collapse of the projections 72. A pair of translation limit brackets 78 are mounted to the upper crossbar 54, each in alignment with one of the head restraint tubes 62. Each limit bracket 78 may be formed from steel, or any suitable structural material. Each limit bracket 78 includes a base 80 that is welded to a top surface of the upper crossbar 54 in alignment with one of the head restraint tubes 62. The limit bracket base 80 extends forward and away from the upper crossbar 54. Each limit bracket 78 also includes a contact portion 82 extending at an upright angle from the limit bracket base 80 to provide an area contact with the head restraint tube 62 to distribute the forces from the impact.

The deformation limit also includes a pair of steel contact target plates 84 that are welded onto the head restraint tubes 62 in alignment with the limit bracket contact portions 82. The limit bracket contact portions 82 and the contact target plates 84 are spaced apart a predetermined distance associated with a designed deformation of the projections 72. The limit bracket contact portions 82 are also angled relative to the contact target plates 84 by an angle $\alpha$. The angle $\alpha$ is sized so that upon the deformation of the tapered projections 72, an area contact is provided with the impact of the limit bracket contact portions 82 and the contact target plates 84.

The contact target plates 84 add structural reinforcement to the head restraint tubes 62 at a region of force distribution in order to minimize distribution of the loading to an internal sleeve that receives the head restraint post 40, 42.

The deformation limit of the limit brackets 78 and the contact target plates 84 can be designed to limit deformation of the bracket 60 to a desired limit, such as an angular range of translation, a predetermined force, elastic deformation, elastic and plastic deformation, or any applicable design specification. Additionally, by controlling the deformation to a particular region of the seatback subassemblies 22, 24, the seatback subassemblies 22, 24 can be designed relatively compact.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat back frame adapted to be mounted to a vehicle interior;
   a bracket mounted to the seat back frame;
   at least one head restraint post mounted to the bracket and spaced apart from the seat back frame so that upon a rear vehicle impact, the bracket deforms as the at least one head restraint post is translated toward the seat back frame; and
   at least one tube mounted to the bracket and sized to receive the at least one head restraint post;
   wherein the bracket is welded to the seat back frame; and
   wherein the at least one tube is welded to the bracket.

2. The vehicle seat assembly of claim 1 wherein the bracket further comprises:
   a substrate;
   a projection extending from the substrate; and
   a mounting surface on the projection to mount the at least one head restraint post.

3. The vehicle seat assembly of claim 2 wherein the projection is tapered with an enlarged region at an upper distal end relative to a lower proximal end.

4. The vehicle seat assembly of claim 2 wherein the projection further comprises a pair of sidewalls extending from the substrate.

5. The vehicle seat assembly of claim 4 wherein the projection further comprises a support plate supported by the pair of sidewalls and spaced apart from the substrate to provide the mounting surface.

6. The vehicle seat assembly of claim 5 wherein the support plate is not parallel with the substrate.

7. The vehicle seat assembly of claim 6 wherein the support plate is oriented at an angle relative to the substrate.

8. The vehicle seat assembly of claim 7 wherein the angle inclines in an upright direction.

9. The vehicle seat assembly of claim 2 wherein the bracket is formed from a sheet of material.

10. The vehicle seat assembly of claim 9 wherein the bracket is formed from sheet steel.

11. The vehicle seat assembly of claim 1 further comprising a head restraint supported upon the head restraint post.

12. A vehicle seat assembly comprising:
    a seat back frame adapted to be mounted to a vehicle interior;
    a bracket mounted to the seat back frame;
    at least one head restraint tube mounted to the bracket and spaced apart from the seat back frame so that upon a rear vehicle impact, the bracket deforms as the at least one head restraint tube is translated toward the seat back frame; and
    at least one head restraint post received within the at least one head restraint tube;
    wherein the bracket further comprises:
      a substrate,
      a projection extending from the substrate, and
      a mounting surface on the projection to mount the at least one head restraint post; and
    wherein the projection is tapered with an enlarged region at an upper distal end relative to a lower proximal end.

13. The vehicle seat assembly of claim 12 further comprising a head restraint supported upon the head restraint post.

14. A vehicle seat assembly comprising:
    a seat back frame adapted to be mounted to a vehicle interior;
    a bracket formed from a sheet of steel, and comprising:
      a substrate welded to the seat back frame,
      two pairs of sidewalls extending from the substrate and tapered with an enlarged region at an upper distal end relative to a lower proximal end, and
      a pair of support plates, each supported by one of the two pairs of sidewalls and spaced apart from the substrate to provide a mounting surface oriented at an angle relative to the substrate facing an upright direction;

a pair of spaced apart tubes each welded to the bracket mounting surface of one of the pair of support plates;

a pair of head restraint posts, each received in one of the pair of tubes; and a head restraint supported upon the pair of head restraint posts, so that upon a rear vehicle impact, the bracket deforms as the pair of head restraint posts are translated toward the seat back frame.

\* \* \* \* \*